(12) United States Patent
Aquinto et al.

(10) Patent No.: US 6,739,613 B2
(45) Date of Patent: May 25, 2004

(54) TOW HITCH REAR BUMPER ASSEMBLY

(75) Inventors: Stephen Michael Aquinto, Plymouth, MI (US); Irfan Sharif, Canton, MI (US); Robert Todd Laster, Wixom, MI (US); Scott Alan Smith, Brownstown Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/352,304

(22) Filed: Jan. 27, 2003

(65) Prior Publication Data

US 2003/0132608 A1 Jul. 17, 2003

Related U.S. Application Data

(62) Division of application No. 09/910,772, filed on Jul. 23, 2001, now Pat. No. 6,581,955, which is a continuation-in-part of application No. 09/698,711, filed on Oct. 27, 2000, now Pat. No. 6,502,848, which is a continuation of application No. 09/296,185, filed on Apr. 26, 1999, now Pat. No. 6,179,320.

(51) Int. Cl.$^7$ ............................................. B60D 1/56
(52) U.S. Cl. ................................. 280/500; 293/117
(58) Field of Search ......................... 280/505, 495, 280/500; 293/117

(56) References Cited

U.S. PATENT DOCUMENTS

| 1,581,432 A | 4/1926 | Fageol |
| 1,935,447 A | 11/1933 | Hoffman |
| 2,604,349 A | 7/1952 | Martinetz |
| 2,753,193 A | 7/1956 | Halverson |
| 2,828,144 A | 3/1958 | Hosmer |
| 3,412,628 A | 11/1968 | De Gain |
| 3,495,474 A | 2/1970 | Nishimura et al. |
| 3,578,358 A | 5/1971 | Reynolds |
| 3,717,362 A | * 2/1973 | Johnson ................. 280/416.1 |
| 3,739,882 A | 6/1973 | Schwenk et al. |
| 3,819,224 A | 6/1974 | Casey et al. |
| 3,831,997 A | 8/1974 | Myers |
| 3,885,817 A | 5/1975 | Christian |
| 3,888,515 A | 6/1975 | Winter |
| 3,897,095 A | 7/1975 | Glance et al. |
| 3,905,630 A | 9/1975 | Cantrell |
| 3,912,295 A | 10/1975 | Eggert, Jr. |
| 3,930,670 A | 1/1976 | Haskins |
| 3,938,841 A | 2/1976 | Glance et al. |
| 3,964,768 A | 6/1976 | Reynolds |
| 3,997,207 A | 12/1976 | Norlin |
| 3,998,485 A | 12/1976 | Putter et al. |
| 4,023,652 A | 5/1977 | Torke |
| 4,190,276 A | 2/1980 | Hirano et al. |
| 4,272,114 A | 6/1981 | Hirano et al. |
| 4,465,312 A | 8/1984 | Werner |
| 4,468,052 A | 8/1984 | Koike |
| 4,829,979 A | 5/1989 | Moir |
| 4,830,686 A | 5/1989 | Hashiguchi et al. |
| 4,893,856 A | 1/1990 | Council |
| 4,901,486 A | 2/1990 | Kobori et al. |
| 5,080,411 A | 1/1992 | Stewart et al. |
| 5,116,092 A | 5/1992 | Schönleber |
| 5,154,462 A | 10/1992 | Carpenter |
| 5,184,840 A | * 2/1993 | Edwards ..................... 280/507 |

(List continued on next page.)

FOREIGN PATENT DOCUMENTS

| DE | 2 137 517 | 2/1973 |
| GB | 2 307 665 | 11/1995 |

*Primary Examiner*—Kevin Hurley
(74) *Attorney, Agent, or Firm*—Gigette M. Bejin

(57) ABSTRACT

A tow hitch rear bumper assembly for a motor vehicle includes a rear bumper for attachment to a frame of the motor vehicle and a tow hitch extending through and integral with the rear bumper.

15 Claims, 6 Drawing Sheets

U.S. PATENT DOCUMENTS

| | | |
|---|---|---|
| 5,201,912 A | 4/1993 | Terada et al. |
| 5,273,330 A | 12/1993 | Petry et al. |
| 5,314,229 A | 5/1994 | Matuzawa et al. |
| 5,364,142 A * | 11/1994 | Coiner .................. 293/117 |
| 5,387,002 A | 2/1995 | Grevich |
| 5,419,416 A | 5/1995 | Miyashita et al. |
| 5,431,445 A | 7/1995 | Wheatley |
| 5,560,631 A | 10/1996 | Salvo |
| 5,620,218 A * | 4/1997 | Saltzman et al. ........ 293/117 |
| 5,628,536 A | 5/1997 | Fulkerson |
| 5,688,006 A | 11/1997 | Bladow et al. |
| 5,722,708 A | 3/1998 | Jonsson |
| 5,727,804 A | 3/1998 | Metzger |
| 5,732,801 A | 3/1998 | Gertz |
| 5,785,367 A | 7/1998 | Baumann et al. |
| 5,803,514 A | 9/1998 | Shibuya et al. |
| 5,829,774 A * | 11/1998 | Klemp .................. 280/507 |
| 5,853,187 A | 12/1998 | Maier |
| 5,876,078 A | 3/1999 | Miskech et al. |
| 5,934,699 A | 8/1999 | Blake |
| 6,139,044 A * | 10/2000 | Smith et al. .............. 280/505 |
| 6,145,865 A | 11/2000 | Cannara et al. |
| 6,149,181 A | 11/2000 | Biederman |
| 6,176,506 B1 | 1/2001 | Blake |
| 6,189,910 B1 | 2/2001 | Bartel |

* cited by examiner

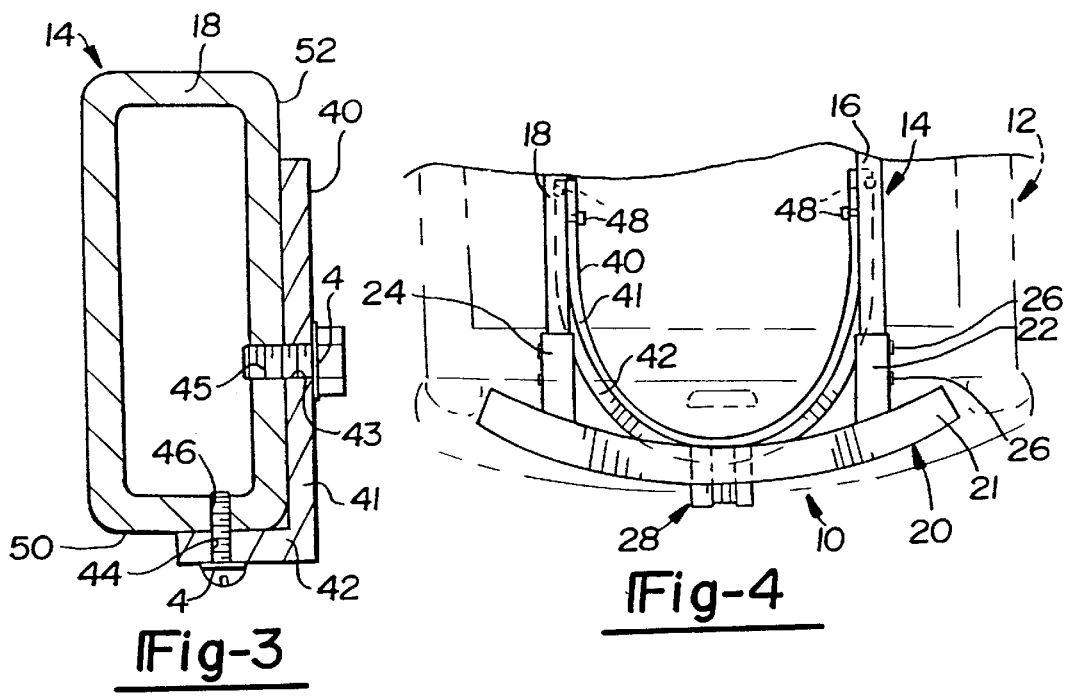
Fig-3
Fig-4
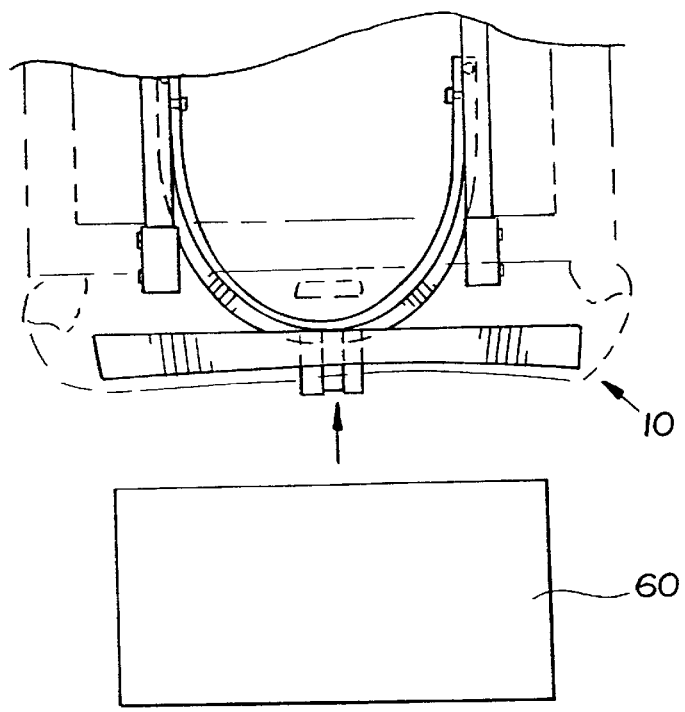
Fig-5

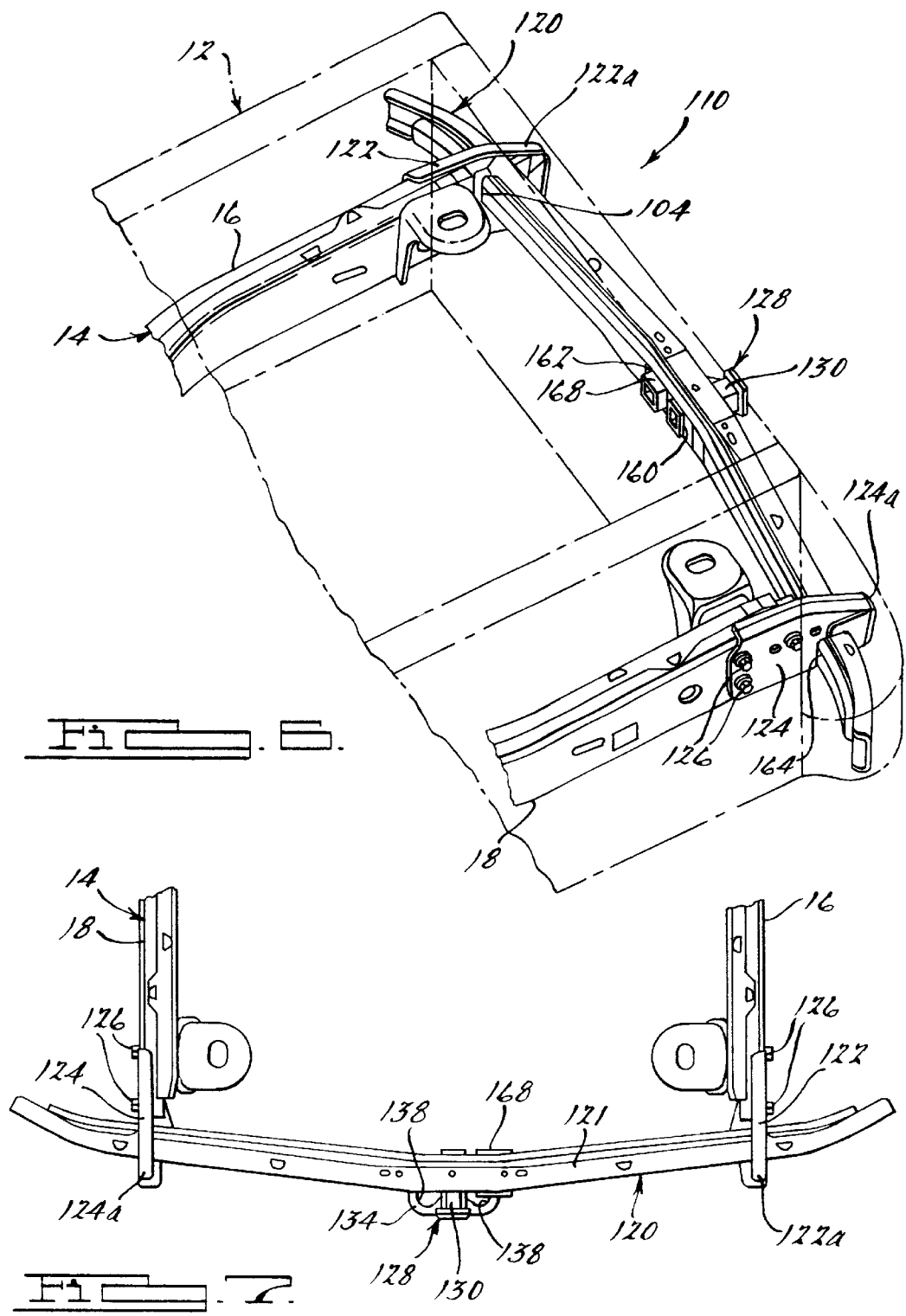

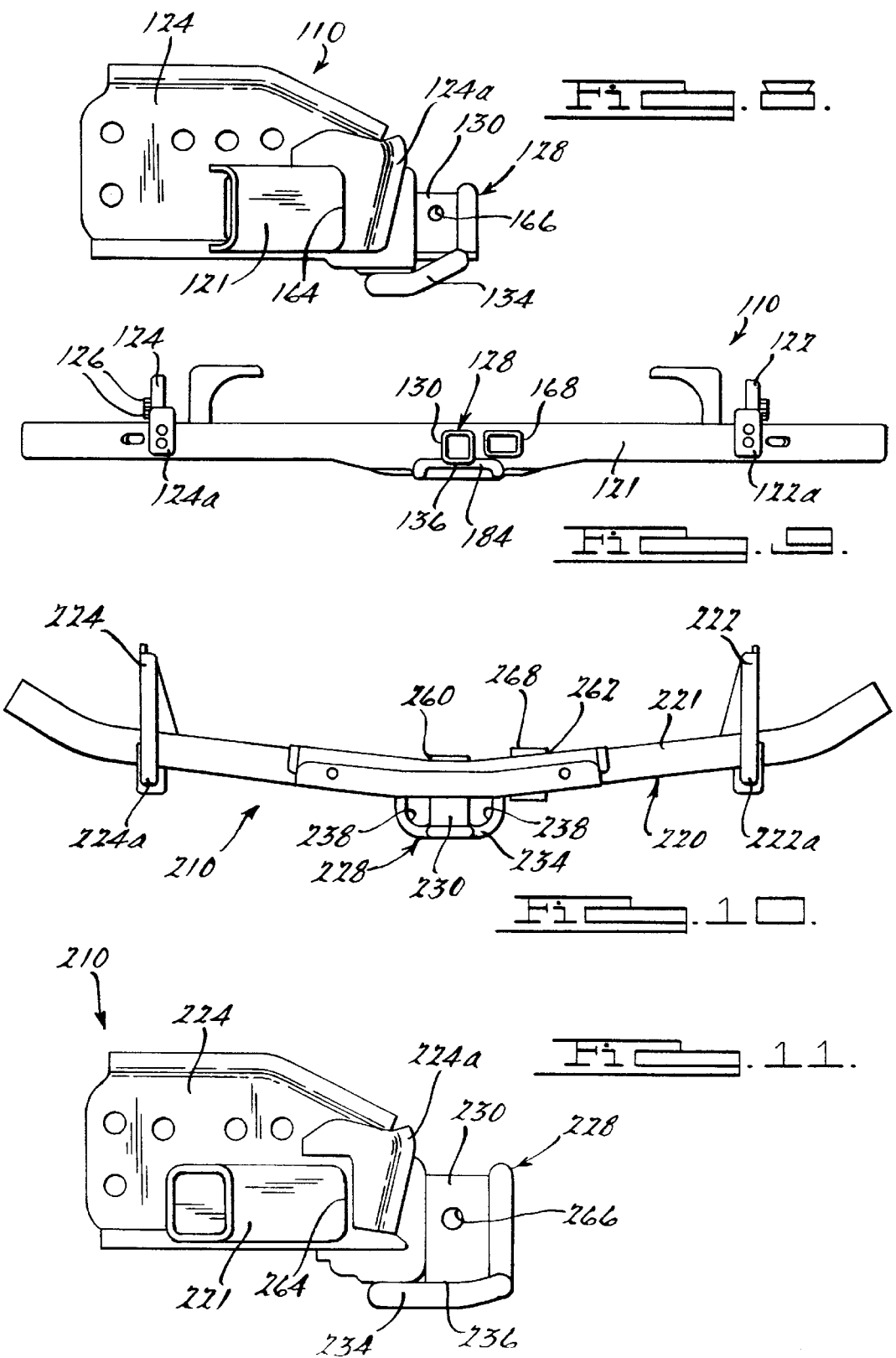

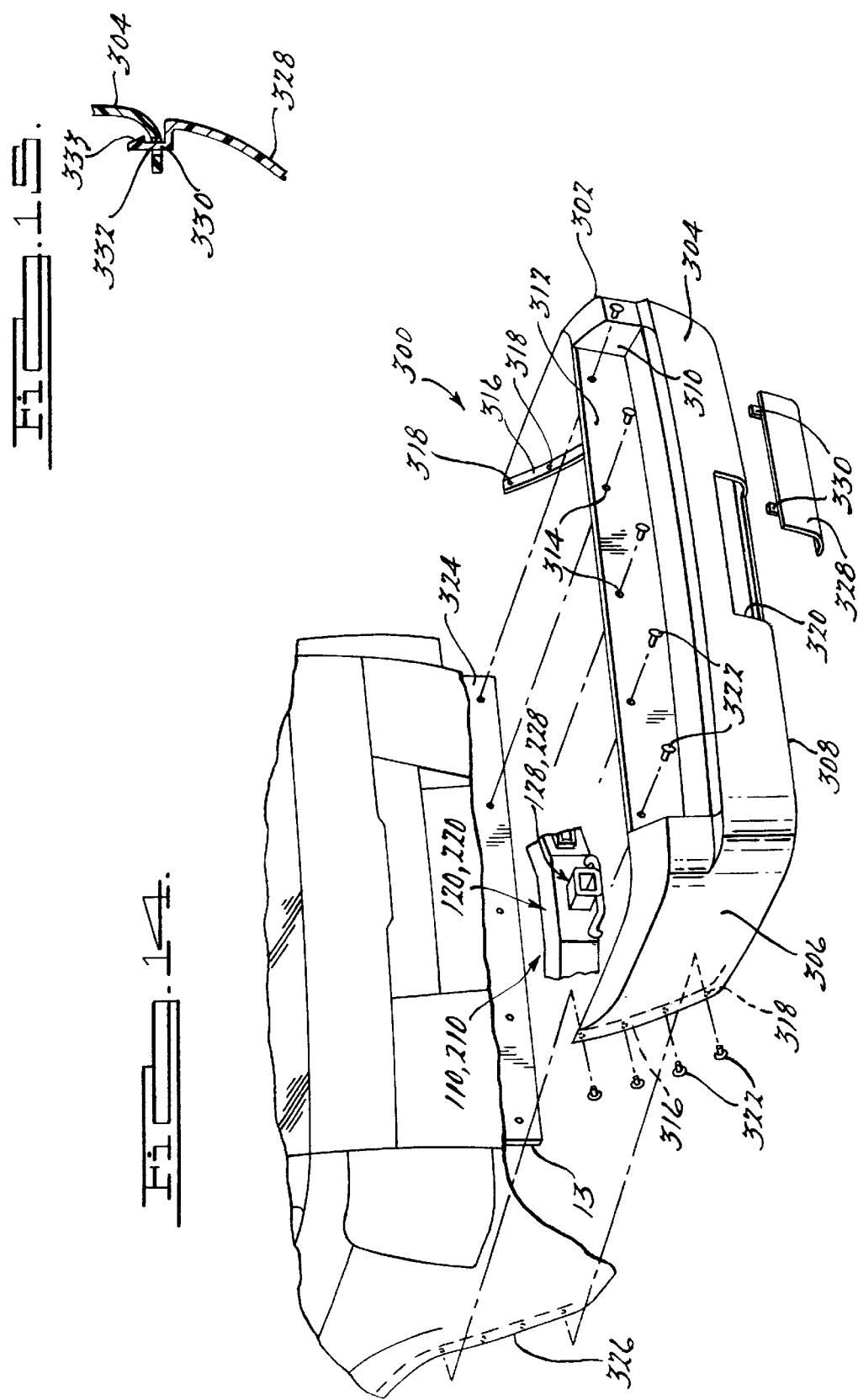

TOW HITCH REAR BUMPER ASSEMBLY

CROSS-REFERENCE TO RELATED APPLICATION(S)

The present invention is a divisional of U.S. patent application Ser. No. 09/910,772, filed Jul. 23, 2001 now U.S. Pat. No. 6,581,955, which is a Continuation-In-Part of U.S. Ser. No. 09/698,711, filed Oct. 27, 2000 now U.S. Pat. No. 6,502,848, which is a continuation of U.S. Ser. No. 09/296,185, filed Apr. 26, 1999 now U.S. Pat. No. 6,179,320.

BACKGROUND OF THE INVENTION

1. Field of the Invention

The present invention relates generally to rear bumpers for motor vehicles and, more specifically, to a tow hitch rear bumper assembly for a motor vehicle.

2. Description of the Related Art

It is known that a motor vehicle is equipped with a rear bumper assembly in order to protect its body in a low speed vehicle collision condition. It is also known that a separate tow hitch assembly may be equipped to a rear end of the motor vehicle in order to provide the motor vehicle with additional towing capacity. The rear bumper assembly typically includes a beam that extends transversely across the rear end of the motor vehicle. The tow hitch assembly typically includes a tow hitch receiver which is disposed under and welded to a transverse tubular cross member and the tubular cross member is mounted to a frame of the motor vehicle through a pair of mounting brackets.

Although the above separate rear bumper and tow hitch assemblies have worked well, it is desirable to integrate these two assemblies into a single assembly in order to share their rigidity for both functions. It is also desirable to have an assembly, which will be lightweight and more durable while still meeting the motor vehicle towing requirement. It is further desirable to provide an integrated assembly that will enhance the rear bumper protection function in a low speed vehicle collision condition. It is yet further desirable to provide an assembly in which the tow hitch extends through the rear bumper. It is still further desirable to provide a cover for the tow hitch and rear bumper. Therefore, there is a need in the art to provide an integrated tow hitch and rear bumper assembly for a motor vehicle.

SUMMARY OF THE INVENTION

Accordingly, the present invention is a tow hitch rear bumper assembly for a motor vehicle. The tow hitch rear bumper assembly includes a rear bumper for attachment to a frame of the motor vehicle. The tow hitch rear bumper assembly also includes a tow hitch extending through and integral with the rear bumper.

In addition, the present invention is a cover assembly for a motor vehicle including a rear bumper for attachment to a frame of the motor vehicle and a tow hitch extending through and integral with the rear bumper. The cover assembly also includes a rear bumper fascia for attachment to the motor vehicle to conceal the rear bumper and a removable door attached to the rear bumper fascia to conceal the tow hitch.

One advantage of the present invention is that a tow hitch rear bumper assembly is provided for a motor vehicle. Another advantage of the present invention is that the tow hitch rear bumper assembly integrates a tow hitch and rear bumper for a motor vehicle. Yet another advantage of the present invention is that the tow hitch rear bumper assembly has a tow hitch which extends through the rear bumper to raise the height or clearance of the tow hitch relative to a driving surface. Still another advantage of the present invention is that the tow hitch rear bumper assembly reduces possible damage to the motor vehicle in a low speed vehicle collision condition. A further advantage of the present invention is that the tow hitch rear bumper assembly is lightweight and meets motor vehicle towing requirements. Yet a further advantage of the present invention is that a cover assembly is provided for a motor vehicle to cover a tow hitch and rear bumper of the motor vehicle.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 3 is a sectional view taken along line 3—3 of FIG. 2.

FIG. 4 is a plan view of the tow hitch rear bumper assembly and a portion of the motor vehicle of FIG. 1.

FIG. 5 is a view similar to FIG. 4 illustrating the tow hitch rear bumper assembly after a high-speed vehicle collision condition.

FIG. 6 is a perspective view of another embodiment, according to the present invention, of the tow hitch rear bumper assembly of FIG. 1.

FIG. 7 is a plan view of the tow hitch rear bumper assembly of FIG. 6.

FIG. 8 is a side elevational view of the tow hitch rear bumper assembly of FIG. 6.

FIG. 9 is a front elevational view of the tow hitch rear bumper assembly of FIG. 6.

FIG. 10 is a plan view of yet another embodiment, according to the present invention, of the tow hitch rear bumper assembly of FIG. 1.

FIG. 11 is a side elevational view of the tow hitch rear bumper assembly of FIG. 10.

FIG. 14 is an exploded perspective view of the cover assembly of FIG. 12.

FIG. 15 is a sectional view taken along line 15—15 of FIG. 12.

DESCRIPTION OF THE PREFERRED EMBODIMENT(S)

Figure 1:
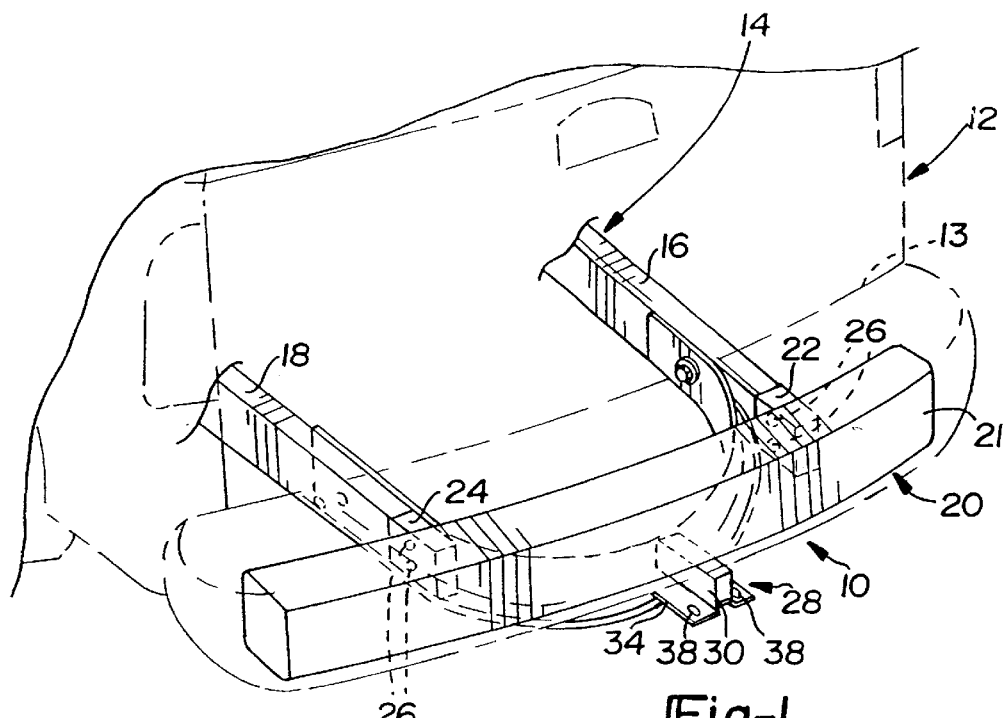
FIG. 1 is a perspective view of a tow hitch rear bumper assembly, according to the present invention, illustrated in operational relationship with a motor vehicle.
Figure 2:
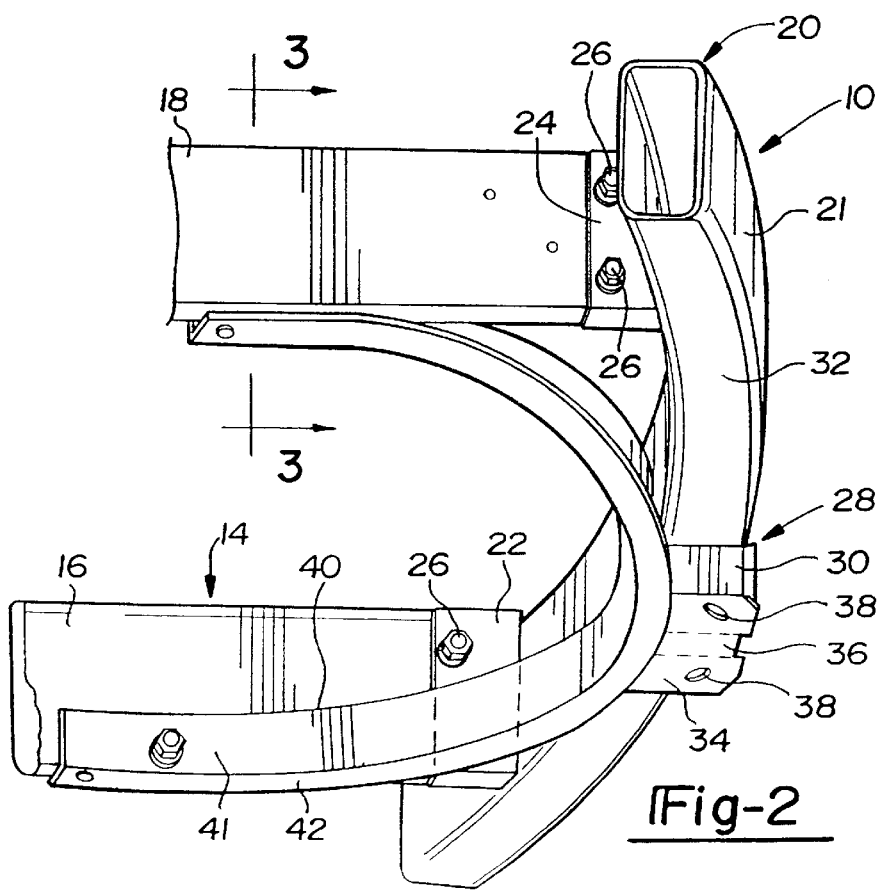
FIG. 2 is a perspective view of the tow hitch rear bumper assembly and a portion of the motor vehicle of FIG. 1.
Figure 12:
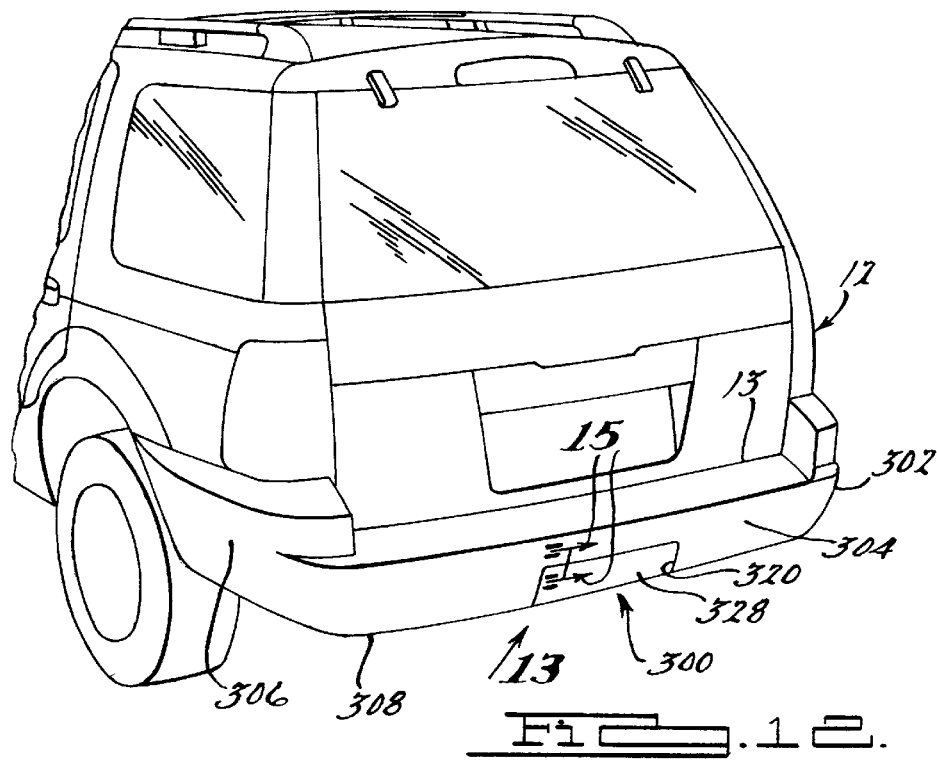
FIG. 12 is a perspective view of a cover assembly, according to the present invention, illustrated in operational relationship with a motor vehicle.
Figure 13:
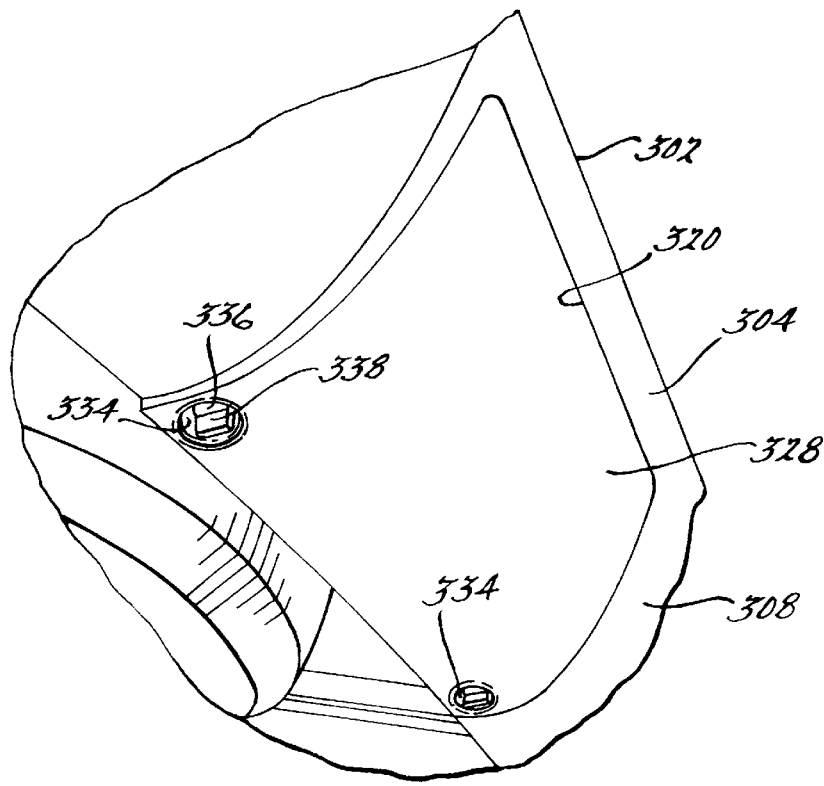
FIG. 13 is a perspective view of the cover assembly looking in a direction of arrow 13 of FIG. 12.

Referring to the drawings and in particular FIGS. 1 and 2, one embodiment of a tow hitch rear bumper assembly 10, according to the present invention, is illustrated in operational relationship with a motor vehicle, generally indicated at 12, such as a pick-up truck or sport utility vehicle. The tow hitch rear bumper assembly 10 is located at a rear end 13 of the motor vehicle 12 and allows for towing of another vehicle such as a trailer (not shown) behind the rear end 13 of the motor vehicle 12.

The motor vehicle 12 includes a frame, generally indicated at 14. The frame 14 includes a pair of side rails 16 and 18 extending longitudinally to the rear end 13 and spaced transversely. The side rails 16 and 18 are generally hollow with a rectangular cross-sectional shape. The side rails 16 and 18 are made of a metal material such as steel. It should be appreciated that the side rails 16 and 18 are conventional and known in the art. It should also be appreciated that, except for the tow hitch rear bumper assembly 10, the motor vehicle 12 is conventional and known in the art.

Referring to FIGS. 1 through 4, the tow hitch rear bumper assembly 10 includes a rear bumper, generally indicated at 20, at the rear end 13 of the motor vehicle 12. The rear bumper 20 includes a rear bumper beam 21 extending transversely. The rear bumper beam 21 is hollow and has a generally rectangular cross-sectional shape. The rear bumper beam 21 is also generally arcuate or curved transversely in shape. The rear bumper beam 21 is made of a metal material such as steel.

The rear bumper 20 also includes at least one, preferably a pair of bumper brackets 22 and 24 to attach the rear bumper beam 21 to the frame 14. The bumper brackets 22 and 24 are hollow with a generally rectangular cross-sectional shape. The bumper brackets 22 and 24 are made of a metal material such as steel. The bumper brackets 22 and 24 are spaced transversely along the rear bumper beam 21 and connected thereto by suitable means such as welding. The bumper bracket 22 is disposed over the side rail 16 and the bumper bracket 24 is disposed over the side rail 18 of the frame 14. The bumper brackets 22 and 24 are connected to the side rails 16 and 18, respectively, by suitable means such as fasteners 26. It should be appreciated that, in this embodiment, the fasteners 26 are bolts and nuts extending through the sides of the bumper brackets 22 and 24 and side rails 16 and 18.

The tow hitch rear bumper assembly 10 also includes a tow hitch, generally indicated at 28, integral with and disposed below the rear bumper 20. The tow hitch 28 includes a hitch receiver 30 for receiving a hitch (not shown). The hitch receiver 30 is a hollow tube having a generally rectangular cross-sectional shape. The tow hitch 28 is made of a metal material such as steel. The hitch receiver 30 extends longitudinally and abuts a bottom face 32 of the rear bumper beam 21. The tow hitch 28 may also include a hitch plate 34 connected to the hitch receiver 30. The hitch plate 34 is made of a metal material such as steel. The hitch plate 34 is a generally rectangular plate connected to a bottom face 36 of the hitch receiver 30 by suitable means such as welding. The hitch plate 34 includes at least one, preferably a pair of apertures 38 with one of the apertures 38 located on each side of the hitch receiver 30. It should be appreciated that the apertures 38 allow tow chains (not shown) to be attached thereto.

The tow hitch rear bumper assembly 10 further includes an arch shaped reinforcement 40 connected to the tow hitch 28 and the frame 14 of the motor vehicle 12. The arch shaped reinforcement 40 has a generally vertical side wall 41 and horizontal bottom wall 42 forming an L shaped cross-section. The arch shaped reinforcement 40 extends transversely in a generally curved or arcuate shape. The arch shaped reinforcement 40 is made of a metal material such as steel. The arch shaped reinforcement 40 has its ends connected to an inboard side of the frame 14. Each end of the arch shaped reinforcement 40 has at least one, preferably a pair of apertures 43 and 44, which are offset and extend through the side wall 41 and bottom wall 42, respectively. The ends of the arch shaped reinforcement 40 are connected by suitable fasteners 48 extending through the apertures 43 and 44 and corresponding apertures 45 and 46 in the side rails 16 and 18. It should be appreciated that the bottom wall 42 is connected to a bottom face 50 of the side rails 16 and 18 and the side wall 41 is connected to an inboard face 52 of the side rails 16 and 18.

The arch shaped reinforcement 40 is vertically inclined to lower its elevation to the level of the hitch receiver 30 and diagonally arch braced against a center span of the rear bumper beam 21 behind the hitch receiver 30. The arch shaped reinforcement 40 has a center thereof connected to a backside of the hitch receiver 30 by suitable means such as welding or fastening with bolts. The arch shaped reinforcement 40 is also connected to the hitch plate 34 by suitable means such as welding.

In operation, one function of the arch shaped reinforcement 40 is to provide support for the hitch receiver 30. Another function of the arch shaped reinforcement 40 is to absorb low speed vehicle collision energy. In a low speed vehicle collision, the arch shaped reinforcement 40 will help the rear bumper 20 rebound back to its original shape through the arch force to minimize repair cost as illustrated in FIG. 4. In a high-speed vehicle collision by an object 60 as illustrated in FIG. 5, the arch shaped reinforcement 40 will first bend forward to prevent the premature bending of the side rails 16 and 18 and the rear bumper beam 21. This will allow the rear bumper 20 and frame 14 of the motor vehicle 12 to crush axially to maximize their energy absorption. Under towing conditions, the rear bumper beam 21 will act like a horizontal cross member to support the tow hitch 28. The arch shaped reinforcement 40 will also serve as the "tension rod" and diagonal bracing for eccentric loading in the towing condition.

Referring to FIGS. 6 through 9, another embodiment, according to the present invention, of the tow hitch rear bumper assembly 10 is shown. Like parts of the tow hitch rear bumper assembly 10 have like reference numerals increased by one hundred (100). In this embodiment, the tow hitch rear bumper assembly 110 includes a rear bumper, generally indicated at 120, at the rear end 13 of the motor vehicle 12. The rear bumper 120 includes a rear bumper beam 121 extending transversely. The rear bumper beam 121 is hollow and has a generally rectangular cross-sectional shape. The rear bumper beam 121 is also generally arcuate or curved transversely in shape. The transverse ends of the rear bumper beam 121 may be open or generally "C" shaped. The rear bumper beam 121 has a generally centrally disposed primary aperture 160 extending longitudinally through a closed cross-section thereof for a function to be described. The rear bumper beam 121 also has a secondary aperture 162 spaced transversely from the primary aperture 160 and extending longitudinally therethrough for a function to be described. The rear bumper beam 121 is made of a metal material such as steel. The rear bumper beam 121 may be a single piece or two pieces having a generally "C" shape and welded together to form a closed rectangular cross-sectional shape. It should be appreciated that the rear bumper beam 121 is for a Class II hitch, which has a lower capacity rating for trailer towing.

The rear bumper 120 also includes at least one, preferably a pair of bumper brackets 122 and 124 to attach the rear bumper beam 121 to the frame 14. The bumper brackets 122 and 124 are hollow with a generally "C" cross-sectional shape. The bumper brackets 122 and 124 have an aperture 164 extending therethrough to receive the rear bumper beam 121 and allow the rear bumper beam 121 to extend therethrough. The bumper brackets 122 and 124 have a bumperette portion 122a and 124a, respectively, extending longitudinally beyond the rear bumper beam 121 for a function to be described. The bumper brackets 122 and 124 are made of a metal material such as steel. The bumper brackets 122 and 124 are spaced transversely along the rear bumper beam 121 and connected thereto by suitable means such as welding. The bumper bracket 122 is disposed over the side rail 16 and the bumper bracket 124 is disposed over the side rail 18 of the frame 14. The bumper brackets 122 and 124 are connected to the side rails 16 and 18, respectively, by suitable means such as fasteners 126. It should be appreciated that, in this embodiment, the fasteners 126 are bolts and nuts extending through the sides of the bumper brackets 122 and 124 and side rails 16 and 18.

The tow hitch rear bumper assembly 110 also includes a tow hitch, generally indicated at 128, integral with and extending through the rear bumper 120. The tow hitch 128 includes a hitch receiver 130 for receiving a hitch (not shown). The hitch receiver 130 is a hollow tube having a generally rectangular cross-sectional shape. The hitch receiver 130 is made of a metal material such as steel. The hitch receiver 130 extends longitudinally through the primary aperture 160 of the rear bumper beam 121 and is connected to opposed walls of the rear bumper beam 121 by suitable means such as welding. The tow hitch 128 may also include a hitch member 134 connected to the hitch receiver 130. The hitch member 134 is a generally "E" shaped rod member. The hitch member 134 is made of a metal material such as steel. The hitch member 134 is connected to a bottom face 136 of the hitch receiver 130 and to the rear bumper beam 121 by suitable means such as welding. The hitch member 134 includes at least one, preferably a pair of apertures 138 with one of the apertures 138 located on each side of the hitch receiver 130. It should be appreciated that the apertures 138 allow tow chains (not shown) to be attached thereto. It should also be appreciated that the hitch receiver 130 may have an aperture 166 extending therethrough to receive a lock pin (not shown) to lock the hitch to the hitch receiver 130. It should further be appreciated that the hitch receiver 130 is welded in two places longitudinally to the rear bumper beam 121 to provide better strength.

The tow hitch rear bumper assembly 110 further includes a wiring receiver 168 for receiving wiring (not shown), which may be connected to a trailer (not shown). The wiring receiver 168 is a hollow tube having a generally rectangular cross-sectional shape. The wiring receiver 168 is made of a metal material such as steel. The wiring receiver 168 extends longitudinally through the secondary aperture 162 of the rear bumper beam 121 and is connected to the rear bumper beam 121 by suitable means such as welding. It should be appreciated that the wiring receiver 168 may have any suitable cross-sectional shape such as circular.

In operation of the tow hitch rear bumper assembly 110, one function of the rear bumper beam 121 is to provide support for the hitch receiver 130. Another function of the rear bumper beam 121 is to absorb low speed vehicle collision energy. In a low speed vehicle collision, the hitch receiver 130 and bumperette portions 122a, 124a of the bumper brackets 122, 124 help the rear bumper beam 121 rebound back to its original shape through three-point contact to minimize repair cost. In a high speed vehicle collision by an object (not shown), the hitch receiver 130 and bumper brackets 122, 124 first move forward and push the vehicle on three points to distribute the load and prevent the premature bending of the side rails 16 and 18 and the rear bumper beam 121. This will allow the rear bumper 120 and frame 14 of the motor vehicle 12 to crush axially to maximize their energy absorption. Under towing conditions, the rear bumper beam 121 will act like a horizontal cross member to support the tow hitch 128. It should be appreciated that the tow hitch 128 has a higher ground clearance to prevent damage thereto due to ramp angle when backing up.

Referring to FIGS. 10 and 11, yet another embodiment, according to the present invention, of the tow hitch rear bumper assembly 10 is shown. Like parts of the tow hitch rear bumper assembly 10 have like reference numerals increased by two hundred (200). In this embodiment, the tow hitch rear bumper assembly 210 includes a rear bumper, generally indicated at 220, at the rear end 13 of the motor vehicle 12. The rear bumper 220 includes a rear bumper beam 221 extending transversely. The rear bumper beam 221 is hollow and has a generally rectangular cross-sectional shape throughout its length. The rear bumper beam 221 is also generally arcuate or curved transversely in shape. The rear bumper beam 221 has a generally centrally disposed primary aperture 260 extending longitudinally through a closed cross-section thereof for a function to be described. The rear bumper beam 221 also has a secondary aperture 262 spaced transversely from the primary aperture 260 and extending longitudinally therethrough for a function to be described. The rear bumper beam 221 is made of a metal material such as steel and is made of a thicker gage of material than the rear bumper beam 121. It should be appreciated that the rear bumper beam 221 is for a Class III or IV hitch, which has a higher capacity for trailer towing.

The rear bumper 220 also includes at least one, preferably a pair of bumper brackets 222 and 224 to attach the rear bumper beam 221 to the frame 14. The bumper brackets 222 and 224 are open with a generally "C" cross-sectional shape. The bumper brackets 222 and 224 have an aperture 264 extending therethrough to receive the rear bumper beam 221 and allow the rear bumper beam 221 to extend therethrough. The bumper brackets 222 and 224 have a bumperette portion 222a and 224a, respectively, extending longitudinally beyond the rear bumper beam 221 for a function to be described. The bumper brackets 222 and 224 are made of a metal material such as steel. The bumper brackets 222 and 224 are spaced transversely along the rear bumper beam 221 and connected thereto by suitable means such as welding. The bumper bracket 222 is disposed over the side rail 16 and the bumper bracket 224 is disposed over the side rail 18 of the frame 14. The bumper brackets 222 and 224 are connected to the side rails 16 and 18, respectively, by suitable means such as fasteners (not shown). It should be appreciated that, in this embodiment, the fasteners are bolts and nuts extending through the sides of the bumper brackets 222 and 224 and side rails 16 and 18.

The tow hitch rear bumper assembly 210 also includes a tow hitch, generally indicated at 228, integral with and extending through the rear bumper 220. The tow hitch 228 includes a hitch receiver 230 for receiving a hitch (not shown). The hitch receiver 230 is a hollow tube having a generally rectangular cross-sectional shape. The hitch receiver 230 is made of a metal material such as steel. The hitch receiver 230 extends longitudinally through the primary aperture 260 of the rear bumper beam 221 and is connected to opposed walls of the rear bumper beam 221 by suitable means such as welding. The tow hitch 228 may also include a hitch member 234 connected to the hitch receiver 230. The hitch member 234 is a generally "E" shaped rod member. The hitch member 234 is made of a metal material such as steel. The hitch member 234 is connected to a bottom face 236 of the hitch receiver 230 and to the rear bumper beam 221 by suitable means such as welding. The hitch member 234 includes at least one, preferably a pair of apertures 238 with one of the apertures 238 located on each side of the hitch receiver 230. It should be appreciated that the apertures 238 allow tow chains (not shown) to be attached thereto. It should also be appreciated that the hitch receiver 230 may have an aperture 266 extending therethrough to receive a lock pin (not shown) to lock the hitch to the hitch receiver 230. It should further be appreciated that the hitch receiver 230 is welded in two places longitudinally to the rear bumper beam 221 to provide better strength.

The tow hitch rear bumper assembly 210 further includes a wiring receiver 268 for receiving wiring (not shown), which may be connected to a trailer (not shown). The wiring receiver 268 is a hollow tube having a generally rectangular cross-sectional shape. The wiring receiver 268 is made of a metal material such as steel. The wiring receiver 268 extends longitudinally through the secondary aperture 262 of the rear bumper beam 221 and is connected to the rear bumper beam 221 by suitable means such as welding. It should be appreciated that the wiring receiver 268 may have any suitable cross-sectional shape such as circular.

In operation of the tow hitch rear bumper assembly 210, one function of the rear bumper beam 221 is to provide support for the hitch receiver 230. Another function of the rear bumper beam 221 is to absorb low speed vehicle collision energy. In a low speed vehicle collision, the hitch receiver 230 and bumperette portions 222a, 224a of the bumper brackets 222, 224 help the rear bumper beam 221 rebound back to its original shape through three-point contact to minimize repair cost. In a high speed vehicle collision by an object (not shown), the hitch receiver 230 and bumper brackets 222, 224 first move forward and push the vehicle on three points to distribute the load and prevent the premature bending of the side rails 16 and 18 and the rear bumper beam 221. This will allow the rear bumper 220 and frame 14 of the motor vehicle 12 to crush axially to maximize their energy absorption. Under towing conditions, the rear bumper beam 221 will act like a horizontal cross member to support the tow hitch 228. It should be appreciated that the tow hitch 228 has a higher ground clearance to prevent damage thereto due to ramp angle when backing up.

Referring to FIGS. 12 through 15, a cover assembly 300, according to the present invention, is illustrated in operational relationship with the motor vehicle 12, such as a sport utility vehicle. The cover assembly 300 is located at a rear end 13 of the motor vehicle 12 and covers or conceals the tow hitch rear bumper assembly 110, 210 at the rear end 13 of the motor vehicle 12 while allowing access to the tow hitch 128, 228 thereof.

In one embodiment, the cover assembly 300 includes a rear bumper fascia 302 at the rear end 13 of the motor vehicle 12 for covering the rear bumper 120, 220. The rear bumper fascia 302 has a rear wall 304 extending transversely. The rear wall 304 is generally rectangular in shape. The rear bumper fascia 302 also has opposed side walls 306 extending longitudinally from the rear wall 304 and spaced transversely from each other. The side walls 306 are generally rectangular in shape. The rear bumper fascia 302 has a bottom wall 308 extending generally perpendicularly from the rear wall 304 and side walls 306.

The rear bumper fascia 302 also has a recess 310 extending longitudinally and transversely in the rear wall 304. The recess 310 is generally rectangular in shape. The recess 310 has a forward wall 312 with a plurality of apertures 314 extending therethrough and spaced transversely therealong for a function to be described. The rear bumper fascia 302 also has a forward flange 316 extending transversely from the end of each of the side walls 306 with a plurality of apertures 318 extending therethrough and spaced vertically therealong for a function to be described. The rear bumper fascia 302 further has an opening 320 in the rear wall 304 and bottom wall 308 for a function to be described. The opening 320 is generally rectangular in shape. The rear bumper fascia 302 is made of a plastic material such as Thermo Plastic Olefin (TPO). It should be appreciated that the rear bumper fascia 302 is integral, unitary, and formed as one-piece.

The cover assembly 300 also includes at least one, preferably a plurality of fasteners 322 to secure the rear bumper fascia 302 to the rear end 13 of the motor vehicle 12. The fasteners 322 are of a screw type and extend through the apertures 314 in the forward wall 312. The fasteners 322 engage a rear body panel 324 of the motor vehicle 12 to secure the rear wall 304 to the rear end 13 of the motor vehicle 12. The fasteners 322 also extend through the apertures 318 in the forward flanges 316 and engage a wheel housing 326 of the motor vehicle 12 to secure the side walls 306 to the rear end 13 of the motor vehicle 12. It should be appreciated that the fasteners 322 may be used to extend through the bottom wall 308 to secure the bottom wall 308 to the rear end 13 of the motor vehicle 12. It should also be appreciated that other flanges (not shown) and fasteners (not shown) may be used to mount the rear bumper fascia 302 to the rear end 13 of the motor vehicle 12. It should further be appreciated that the fasteners 322 are conventional and known in the art.

The cover assembly 300 further includes a removable door 328 to close the opening 320 in the rear wall 304 of the rear bumper fascia 302. The door 328 is generally rectangular in shape and complementary to the shape of the opening 320. The door 328 extends transversely and vertically to fill the opening 320 in the rear wall 304 and longitudinally to fill the opening 320 in the bottom wall 308. The door 328 has at least one, preferably a plurality of tabs 330 extending upwardly from a top edge thereof. The tabs 330 are generally rectangular in shape and spaced transversely. The tabs 330 are received in corresponding apertures 332 in the rear wall 304 of the rear bumper fascia 302 at a top edge of the opening 320. The tabs 330 may have a flange 333 extending outwardly to prevent the tabs 330 from unintentionally exiting the apertures 332. The door 328 has at least one, preferably a plurality of apertures 334 extending therethrough near a bottom edge thereof for a function to be described. The door 328 is made of a plastic material such as Thermo Plastic Olefin (TPO). It should be appreciated that the door 328 is integral, unitary, and formed as one piece.

The cover assembly 300 further includes at least one, preferably a plurality of fasteners 336 to secure the door 328 to the rear bumper fascia 302. The fasteners 336 are of the turn-screw type and have a flange 338 extending outwardly to allow an operator to grip the fasteners 336. The fasteners 336 extend through the apertures 334 in the door 328 and engage corresponding apertures (not shown) in the bottom wall 308 of the rear bumper fascia 302 to secure the door 328 to the rear bumper fascia 302. It should be appreciated that the fasteners 336 are conventional and known in the art.

In operation of the cover assembly 300, the rear bumper fascia 302 is secured to the rear end 13 of the motor vehicle 12 with the fasteners 322. When secured to the motor vehicle 12, the rear bumper fascia 302 conceals the rear bumper 120, 220. The opening 320 allows access to the tow hitch 128, 228. To close the opening 320, the door 328 is moved by an operator toward the opening 320 and upward to dispose the tabs 330 in the recesses 322 of the rear wall 304. The door 328 is rotated downward and forward to align the fasteners 336 with the corresponding apertures in the bottom wall 308. The fasteners 336 are rotated via the flanges 338 to secure the door 328 to the rear bumper fascia 302. When the door 328 is secured to the rear bumper fascia 302, the tow hitch 128, 228 is concealed from view. To remove the door 328 from the rear bumper fascia 302 to access the tow hitch 128, 228, the operation is reversed. It should be appreciated that when the door 328 is disposed in the opening 320, the door 328 is flush with the rear wall 304 and bottom wall 308 of the rear bumper fascia 302. It should also be appreciated that the door 328 may be planar or have a projection (not shown) extending outwardly corresponding to the location of the tow hitch 128, 228. It should further be appreciated that the door 328 is integrated with the rear bumper fascia 302 and covers a hard surface of the tow hitch 128, 228 normally protruding from the motor vehicle 12, while being aesthetically pleasing.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A tow hitch rear bumper assembly for a motor vehicle comprising:
    a rear bumper beam for attachment extending transversely to a frame of the motor vehicle;
    at least one bumper bracket connected to said bumper beam, with said at least one bumper bracket having an aperture extending therethrough and receiving said bumper beam, and with said bumper bracket being attached to a frame side rail of the motor vehicle; and
    a tow hitch extending through and integral with said rear bumper.

2. A tow hitch rear bumper assembly as set forth in claim 1 wherein said rear bumper beam is made of a metal material.

3. A tow hitch rear bumper assembly as set forth in claim 1 wherein said rear bumper beam extends transversely.

4. A tow hitch rear bumper assembly as set forth in claim 1 wherein said rear bumper beam is hollow and has a central closed cross-section with at least one aperture extending longitudinally through said closed cross-section.

5. A tow hitch rear bumper assembly as set forth in claim 1 wherein said at least one bumper bracket has a portion extending longitudinally beyond said rear bumper beam.

6. A tow hitch rear bumper assembly a set forth in claim 4 wherein said tow hitch includes a hitch receiver extending longitudinally through said at least one aperture and connected to said rear bumper beam.

7. A tow hitch rear bumper assembly as set forth in claim 6 wherein said tow hitch includes a hitch member connected to said hitch receiver and said rear bumper beam.

8. A tow hitch rear bumper assembly as set forth in claim 4 including a wiring receiver extending longitudinally through said at least one aperture and connected to said rear bumper beam.

9. A tow hitch rear bumper assembly for a motor vehicle comprising:
    a rear bumper beam extending transversely for attachment to the side rails of a frame of the motor vehicle, said rear bumper beam extending transversely and being hollow with a central closed cross-section;
    a hitch receiver extending through said closed cross-section and connected to said rear bumper beam;
    a reinforcement member extending between said side rails and having a central portion connected to said hitch receiver; and
    a plurality of bumper brackets connected to said rear bumper beam for attachment to the frame of the motor vehicle, with each of said bumper brackets having an aperture extending therethrough and receiving said rear bumper beam.

10. A tow hitch rear bumper assembly as set forth in claim 9 wherein each of said bumper brackets have a portion extending longitudinally beyond said bumper beam.

11. A rear bumper system as set forth in claim 9 wherein said rear bumper beam includes at least one aperture extending longitudinally through said closed cross-section.

12. A tow hitch rear bumper assembly as set forth in claim 11 wherein said hitch receiver extends longitudinally through said at least one aperture and is welded to said rear bumper beam.

13. a tow hitch rear bumper assembly as set forth in claim 11 including a wiring receiver extending longitudinally through said at least one aperture and welded to said rear bumper beam.

14. A tow hitch rear bumper assembly as set forth in claim 9 including a hitch member connected to said hitch receiver and said rear bumper beam.

15. A tow hitch rear bumper assembly for a motor vehicle comprising:
    a rear bumper beam extending transversely and a plurality of bumper brackets connected to said rear bumper beam for attachment to side rails of the motor vehicle, wherein each of said bumper brackets have an aperture extending therethrough and receiving said rear bumper beam; and
    a hitch receive extending through a closed cross-section of said rear bumper beam and welded to said rear bumper beam.

* * * * *